May 28, 1963

J. HENRY-BAUDOT 3,091,715

AXIAL AIRGAP ROTARY MACHINES

Filed July 27, 1961

2 Sheets-Sheet 1

Inventor:
Jacques Henry-Baudot
By Lemon, Palmer,
Stewart & Estabrook
Attorneys

May 28, 1963    J. HENRY-BAUDOT    3,091,715
AXIAL AIRGAP ROTARY MACHINES
Filed July 27, 1961    2 Sheets-Sheet 2

Inventor: Jacques Henry-Baudot
By Kenyon, Palmer, Stewart & Estabrook
Attorneys

United States Patent Office 3,091,715
Patented May 28, 1963

3,091,715
AXIAL AIRGAP ROTARY MACHINES
Jacques Henry-Baudot, Antony, Seine, France, assignor to Printed Motors Inc., New York, N.Y.
Filed July 27, 1961, Ser. No. 127,207
Claims priority, application France Aug. 3, 1960
4 Claims. (Cl. 310—268)

The present invention relates to axial airgap electric rotary machines, made of disc-shaped members, of the kind wherein the windings are made from a printed-circuit technique and comprise flat conductors intimately adhering to both faces of a thin insulating carrier whereupon they are distributed in two sets of half-turns the ends of which are connected from face to face for completing the electrical pattern of the complete winding.

Such printed-circuit windings may be used as well in rotors as in stators of either D.C. or A.C. electric rotary machines. When such a winding is used as a rotor, the brushes directly apply on the conductors thereof, in a D.C. machine; in an A.C. machine, conductive rings are formed on the carrier and connected directly to the conductors and brushes or sliders contact such rings. Such a printed-circuit winding may constitute the complete rotor of a machine, being inserted between a pair of stator members one of which is an inductor, the other one being either an inductor or a mere magnetic yoke. Several such windings may be assembled by coadaptation within a single magnetic airgap, being either serially connected or progressively put into operation, or else one of the windings being supplied and another one being a current generator winding; and so forth, several other arrangements having presently been disclosed by applicant for the use of such printed-circuit winding members, as rotors of electric machines.

Such printed-circuit windings may also be used as inductor windings in stator parts of rotary machines, mainly in A.C. machines; they are applied against magnetic discs, preferably so constructed as to avoid eddy currents therein. The rotors of such machines may be either of the squirrel-cage kind, or further comprise printed-circuit windings of the same kind as the stator inductor ones.

In the attached FIGS. 1 to 3, there are shown three illustative examples of such combinations of electric rotary machines as herein above referred to: for the sake of simplicity, the current translating means are omitted in said FIGS. 1 to 3, i.e. brushes, slip-rings and mere terminals (for the stator members); also are omitted the details of the mechanical mountings in said machines.

Figure 1:
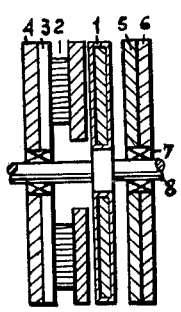

In FIG. 1, the rotor 1 is made of a printed-circuit winding of the above-specified kind, i.e. a two-face printed winding and is mounted on a shaft 8 journalled in bearings 7 mounted within mounting plates 4 and 6. The stator comprises two members, one of which includes a ring of permanent magnet poles 2 connected on a magnetic yoke ring 3, the other of which is made of a mere magnetic ring 5. The magnetic ring 5 may be made part of the rotor if required or may be replaced by another ring of magnet poles on a yoke ring, if also required. For small power machines, the ring or rings of permanent magnet poles may be made of a highly coercive ring, such as ferrite ring, whereupon the magnetic poles have been remanently magnetized.

Figure 2:
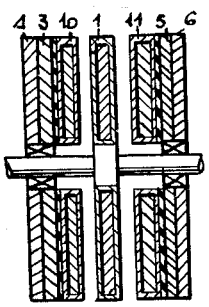

In FIG. 2, the same rotor as in FIG. 1 is mounted between two stator members, each of which comprises a magnetic eddyless current ring, 3 or 5, and a two-face printed-circuit winding 10 or 11 respectively. Said windings will be supplied for the generation of a rotating magnetic field. The rotor will be provided either with brushes or slip-rings as the case may be and as it was possible so to do for the rotor of FIG. 1. One of the stator inductors may be omitted and replaced by a mere magnetic yoke ring. The windings 10 and 11 may be glued to the faces of the rings 3 and 5 and said rings may be constituted by the spiralling of a magnetic ribbon on the edge thereof. The windings are applied to such rings with the intercalation of dielectric or other insulating films.

Figure 3:
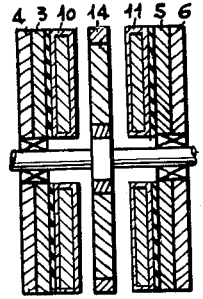

In FIG. 3, the stator is the same as in FIG. 2, but the rotor is of the squirrel-cage kind 14. One of the stator members may be omitted or replaced by a yoke ring, or else a single stator member may be provided between two rotor members, one of which may be a squirrel-cage one and the other, for instance a ring of magnets; and so on.

One of the main advantages of machines embodying printed-circuit windings of the specified kind and such structures as above described lies in the suppression of any iron slots which suppression totally eliminates the distortions of the magnetic flux. Another advantage lies in the capability of supporting high current loads, from the printed-circuit feature proper. Further important advantages are to be found in such structures, mainly for the manufacture of high number of poles, small power and dimensions rotary machines, no difficulty of wiring being met with the printed-circuit techniques as applied to disc-shaped windings.

In such machines however, the copper thickness is introduced in the airgap and the induction within said airgap must be appreciably high, notwithstanding the relatively small thickness of said copper and the dielectric whereon it is attached. This is quite compatible for relatively small power machines but, when increasing the power, the copper thickness must be also increased which may lead to a drawback as it reduces the magnetic induction in the airgap and increases the dissipation, or loss of energy, in the copper. A mere increase of the magnetization flux will produce a lowering of the efficiency in the machines.

For at least partially avoiding such a drawback, applicant has previously proposed to make all the conductors in the printed-circuit winding in a material which is both magnetic and electrically conducting, for instance in iron or the like. However, this provision encounters a limitation, viz. iron is more resistive than copper, the resistance of the winding increases and in consequence, the dissipation increases in the member.

The invention relates to a further improvement which avoids such a limitation of use of the printed-circuit winding, mainly though not exclusively for A.C. machines, said provision ensuring the obtention of an increased magnetic induction in the airgap together with reduced dissipation and magnetising force, for a same intensity of the inductor field.

According to the invention, the winding conductors are, at least on part of their length, slotted and the slots are filled with a magnetic material. By suitably apportioning the relative areas of copper and iron or other magnetic material, whether or not a conducting one, the above mentioned drawback is avoided as, obviously, the magnetic airgap is substantially reduced by the inclusion of a magnetic material in the winding proper, and the current dissipation is not excessive as sufficient copper remains for limiting the said dissipation even at higher powers of machines.

Figures 4, 5:
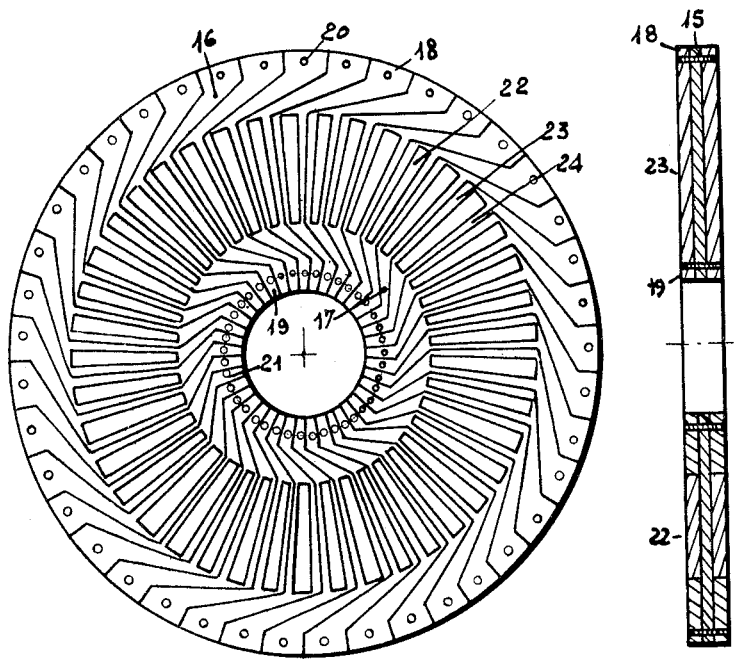
Figure 6:
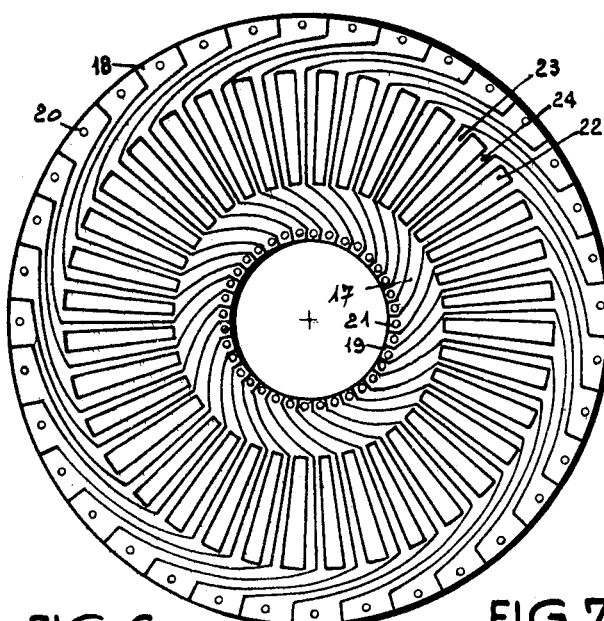
Figure 7:
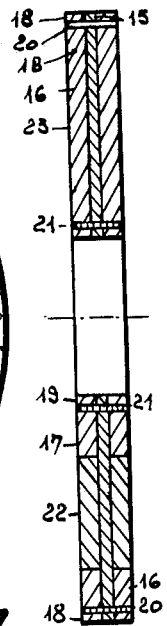

FIG. 4 is a view of one face of a winding made according to the inveniton, said winding being of the lap type;
FIG. 5 is a cross-section view of FIG. 4;
FIG. 6 is a view of one face of another winding made in accordance with the invention and of the lap or mesh kind;
FIG. 7 is a cross-section view of FIG. 6.

Such examples may be used as well as rotors as stators as the case may be, in such schemes of machines as shown in FIGS. 1 to 3. Of course, the number of conductors is merely indicative and may be varied at will.

Figure 8:
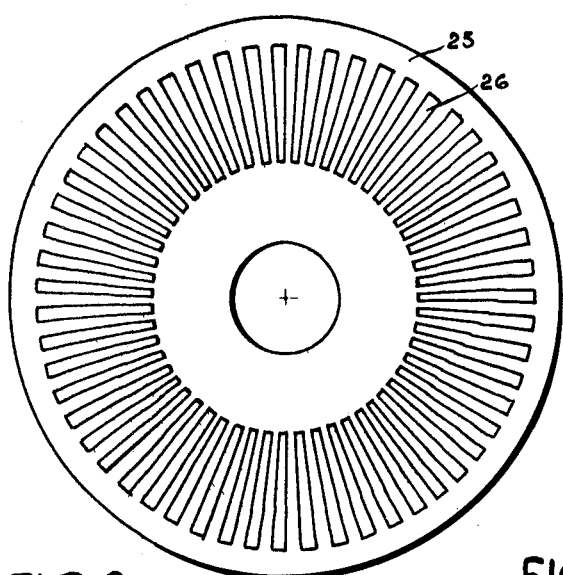

As in FIG. 3, the rotor is said to be a squirrel-cage one; FIG. 8, in a front view, and FIG. 9, in cross-section view, illustrate such a squirrel-cage member, preserving the advantages obtained from the use of printed-circuit winding according to the invention as other parts of the machines.

A two-face printed-circuit winding is generally made of two sets of half-turn conductors on the respective faces of a thin intermediate insulating carrier 15, FIGS. 5 and 7. Each set of half-turn conductors presents the same pattern from one face to the other one but, of course, the inclined or curved portions of the conductors, inner portions 16 and outer portions 17 with respect to the insulating ring 15, appear of opposite directions with respect to each other of the sets as printed on the carrier. The median or middle portions of the conductors are the active ones, and may be substantially inclined or curved if required, though shown as substantially radial in the drawings. In a series-wave winding, the end portions 16 and 17 are of similar orientation on each face; in a lap winding, said parts are of opposite orientations on the same face of the member, FIGS. 4 and 6. The number of conductors per face is odd in a series-wave winding, and even in a lap winding. The conductors end in terminal coatings, outer terminals 18 and inner terminals 19, arranged in two peripheral rings on the carrier. Said terminal coatings face each other and through them are made face-to-face connections, 20 for the outer ring and 21 for the inner ring, made for instance by hole metallizing process through the insulating carrier. Such face-to-face connections complete the electrical pattern of the winding, prepared by the shapes of the turns.

In the prior arrangements of such windings, any half turn conductor, whether made of copper or iron comprised a median part, the electromagnetically active one, which was substantially of sectoral shape. According to the present invention at least those parts are provided with elongated slots 22, for instance also of a sectoral shape, and said slots are filled in with a magnetic material, whether or not conducting the electrical current. Each half-turn conductor consequently comprises two branches 23 and 24 between which is included a magnetic slab or filling 22, said branches connecting to the end portions of the conductors, and primarily to the terminal coatings, as the curved or inclined portions may also be provided with slots filled with magnetic material if required. When the magnetic filling is electrically conductive, it may be in conductive contact with the remaining part of the conductor or may be insulated therefrom; this is not important to the purpose of the invention.

As this feature is common to any kind of printed-circuit disc-shaped winding, the same reference numerals have been applied to FIGS. 4 to 7, inclusive, irrespective of the pattern proper of the windings.

When the half-turn conductors are uniformly incurved, as it has also been previously proposed by applicant, the slots and fillings will extend substantially throughout the entire length of the half-turn conductors, terminal coatings excepted.

For obtaining such printed-circuit windings, several methods may be used. For instance, the copper pattern or the iron pattern may be first formed by any known printed-circuit technique, and the other material may be brought thereafter, for filling the voids between the printed parts of the first pattern. For instance, iron rings may be first glued to the carrier, and etched for instance by any suitable photo-etching process. Thereafter copper is deposited around the iron areas 22 which have been obtained, iron being protected by a suitable resist during said copper deposition. Conversely, the copper pattern may be first made by glueing copper sheets to the faces of the insulating carrier, then photo-etching enables the obtension of the copper conductors with the slots 22 and iron tongues may be forced within said slots, or colloidal iron may be deposited therein. Other methods will be apparent to the printed-circuit engineer for obtaining the sought result.

Figure 9:

Concerning the squirrel-cage member for certain kinds of machines embodying windings made according to the invention wherein the advantages obtained are to be preserved in any component parts thereof, a copper disc 25, FIGS. 8 and 9 may be machined with coined slots wherein are forced iron slabs 26, for instance.

When required, conductive rings may be obtained with the winding conductors as herein above stated for A.C. operating machines, wherein the printed-circuit windings are used in the rotor parts. For the stator parts, mere connecting terminals suffice for the windings.

What is claimed is:

1. A two-face printed-circuit winding for an electric rotary machine of the kind comprising two sets of half-turn conductors intimately adhering on the opposite annular faces of an insulating disc-shaped carrier, said conductors being so shaped as to complete the electrical pattern of the winding by face-to-face connections between the ends thereof, wherein each half-turn conductor is provided with a longitudinally extending slot in at least the mid part thereof and said slot is filled in by a magnetic material, said conductors being contiguous for covering the complete annular areas of the carrier faces.

2. A two-face printed-circuit winding according to claim 1, wherein the outer surfaces of said conductors and the said magnetic material are flush in the airgap of the machine.

3. A two-face printed-circuit winding according to claim 2, wherein each magnetic filling of the slots is made of an integral magnetic member.

4. A two-face printed-circuit winding according to claim 2, wherein each magnetic filling of the slots is made of magnetic particles glued in an insulating divided material.

No references cited.